United States Patent
Sawatsky

(10) Patent No.: US 6,346,315 B1
(45) Date of Patent: Feb. 12, 2002

(54) HOUSE WARES AND DECORATIVE PROCESS THEREFOR

(76) Inventor: Henry Sawatsky, R.R. #3, Wiarton On. (CA), N0H 2T0

( * ) Notice: Subject to any disclaimer, the term of this patent is extended or adjusted under 35 U.S.C. 154(b) by 0 days.

(21) Appl. No.: 09/621,956

(22) Filed: Jul. 21, 2000

Related U.S. Application Data

(63) Continuation-in-part of application No. 08/954,041, filed on Oct. 20, 1997, now abandoned.

(51) Int. Cl.[7] .................................................. B32B 3/00
(52) U.S. Cl. ....................... 428/201; 428/195; 428/198; 428/339
(58) Field of Search ................................. 428/335, 420, 428/425, 429, 339, 195, 198, 201; 427/333, 379, 387

(56) References Cited

U.S. PATENT DOCUMENTS

| | | | |
|---|---|---|---|
| 3,415,673 A | | 12/1968 | Clock |
| 3,877,969 A | | 4/1975 | Tatsumi et al. |
| 4,056,208 A | * | 11/1977 | Prejean |
| 4,065,590 A | | 12/1977 | Salensky |
| 4,093,759 A | * | 6/1978 | Otsuki et al. |
| 4,098,934 A | | 7/1978 | Brockway et al. |
| 4,256,788 A | * | 3/1981 | Gras |
| 4,668,574 A | * | 5/1987 | Bolton et al. |
| 4,940,613 A | * | 7/1990 | Golino |
| 4,961,976 A | | 10/1990 | Hashimoto et al. |

OTHER PUBLICATIONS

Industrial Painting & Practices –Norman R.Roobol. Hitchcock Publishing Co Library of Congress Cat.# 91–073188.

* cited by examiner

*Primary Examiner*—Merrick Dixon
(74) *Attorney, Agent, or Firm*—D. W. Eggins

(57) ABSTRACT

House wares, including frangible wares, comprising glassware, earthenware including china, and ceramics, the glassware including dishes and vessels such as drinking glasses, are coated with a protective plastic coating, usually including an initial adhesion-promoting silane, and a coating of urethane, such as a high temperature urethane to give protection to the underlying layers, and to the article, including protection within a commercial dishwasher. The silane combines with glass, and couples strongly with urethane. The urethane is highly receptive to decoration, which may be transferred or printed onto the urethane surface. If sublimation is applied to the decoration, then subsequent application of a sealing outer coat of urethane may prove unnecessary. For transfer or screen printed decoration, an outer protective urethane coating is applied to serve as a safety coating, to diminish breakage during both handling and use, and to act as a safeguard to hermetically contain any toxic content of the article or any decorative feature. The high temperature urethane outer coating is preferably a thermosetting urethane, capable of withstanding temperatures as high as about 400 F. degrees. With the capability of selectively varying the respective thicknesses of the urethane coating/coatings, a range of desired characteristics, of resistance to chemicals, abrasion and impact for the vessel composite can be provided. The coating can be provided within vessels such as drinking mugs, in order to seal off any toxic components of the vessel. The process may also be used with unglazed ware. Use of the process with flatware also is contemplated, including application of clear coatings over gold and silver decoration or plating, to prevent tarnishing and wear.

20 Claims, 2 Drawing Sheets

HOUSE WARES AND DECORATIVE PROCESS THEREFOR

CROSS REFERENCE TO RELATED APPLICATIONS

This application is a Continuation-in-Part of Application Ser. No. 08/954,041 filed Oct. 20, 1997 abandoned.

BACKGROUND OF THE INVENTION

1. Field of the Invention

The present invention is directed to improved house wares including frangible wares such as personal-use glassware, plateware of earthenware and china, and to ceramic wares; and to a method for applying a decorative, protective and safety coating to the wares, and to providing wares having a protective coating, for decoration.

2. Description of the Prior Art

In the provision of personal use frangible wares, it is common practice to decorate the visible surfaces, frequently in plain colour, and also with a wide variety of patterns, printed matter,etc. In the case of glass-ware, such as drinking glasses, particular difficulty is experienced in providing low cost decoration, due to difficulties experienced in effecting transfer onto the surface of the glass of a durable, or readily protected image.

Existing methods of decoration include screen printing with inks containing ground glass, and transfer printing from a decal which has been printed with ground glass inks.

The printed glassware must then be fired in a Lehr type conveyorized oven or hand loading into a convection oven, and fired at 1200 F. degrees in order to fuse the ink.

A further drawback of existing systems for decorating personal use ceramic and other frangible wares are the imperative health laws, requiring the use solely of non-toxic material, (lead and cadmium being toxic) thereby precluding the use of a wide alternative range of available industrial coloured materials, which fall outside such legal requirements.

Concerning the matter of toxicity, while processes do exist in which lead glazes can be applied that are non-toxic, in the case of ceramic wares such as mugs that are obtained from sources over which effective manufacturing control cannot be exercised, the possibility exists that the glaze used may be a toxic lead glaze.

In the absence of a low cost, rapidly determinable toxicity test by which the glaze toxicity of such wares can be economically determined, there exists a need to be able to protectively coat the internal surfaces of such wares in a manner to effectively seal off the internal wetted surfaces, so that toxic leaching cannot occur.

The external coating of glass containers with plastic, for purposes of safety, is well known. Thus, U.S. Pat. No. 3,415,673 Dec. 10, 1968, Clock, incorporated by reference, teaches the coating of glass containers such as bottles with a thin plastic coating. Surface pre-treatment with a polyethylene imine to promote adhesion is followed by an application of a copolymer coating in the range of 0.002–0.150 inches, i.e. 2–150 mil. The copolymer comprises a major portion of ethylene, and an acidic co-monomer of a specified wide group of acids, being applied to a considerable thickness as an electrostatic powder spray. A varnish finish is then applied by dip coating.

Many other patents relate to the coating of frangible articles such as bottles etc., primarily for safety purposes.

U.S. Pat. No. 4,065,590 Dec. 27, 1977, teaches the application of a modified protective plastic coating to glass soft drink bottles for carbonated beverages, to diminish the likelihood of fracture of the plastic while increasing its glass-retentive capability, so as to secure, or at least localize the dispersal of glass shards and fragments, in the event of fracturing of the bottle. Subsequent attempts have been made by the present inventor to adapt the above-mentioned ('590) protective plastic coating for glass soft drink bottles to other uses, in which a further, polyurethane coating of heat resistant plastic was applied in protective relation over a first ('590) coating to form a combined coating, with the intention of protecting the patented coating against degradation within a hot environment, to thereby enable use of the vessel in a commercial dishwasher, operating at a temperature of 82 degrees C. or greater. These tests were unsuccessful as the very first dishwashing resulted in the peeling off of the combined coating.

U.S. Pat. No. 4,256,788 Gras, teaches the use of a urethane protective coating applied over a silane subcoating, the coatings being applied as pastes. With irregularities in paste consistency, and in the absence of a suitable method for readily and evenly applying the paste coatings to the glass surfaces, product appearance is unacceptable, and the quantity of the paste applied is somewhat excessive (50–250 microns thick) and uneconomical. The glasses are greatly strengthened, but tests showed that the shards were not retained at or adjacent the point of impact, but were scattered. Also, the aesthetic appearance of the glasses was unacceptable, with diminished clearness and optical brightness, while the necessary thickness of plastic was a significant adverse cost factor.

Traditionally, glass and ceramics have been decorated by applying ceramic inks by way of screen printing or transfer printing, and fusing the ceramic inks at 1200 F. degrees.

Also well known is the application of precious metals, silver and gold that are applied by way of a coating wheel and then fired in the manner of ceramics. These metals are subject to tarnish, and tend ultimately to fail under normal dishwasher exposure.

Another new process, known as "sublimation", now used solely on ceramic wares, generally white products having a clear polyester coating, involves the application of organic inks by a transfer process, followed by vaporization of the inks to embed them into the polyester coating. The use of such organic inks permits the provision of a wide range of colours. In the case of glassware, it has been found that due to the substantially non-adhesion of polyester to glass, the sublimation process cannot be used, being thus limited to use with ceramics. In such cases, the polyester has been found to be vulnerable to chipping, and when chipped, the polyester coating becomes vulnerable to separation on immersion in hot water. It appears significant that in the case of a number of prior patents that have been consulted, having teachings bordering on the present invention, none of those teachings appear to be directed to practicable products suitable for practical use, nor do the respective processes provide products that meet the needs of the glass or ceramic drinking or serveware market. Also, no attempt appears to have been made to solve the problems associated with providing protected wares suitable for use with commercial or domestic dishwashers.

SUMMARY OF THE INVENTION

The present invention provides a method of providing housewares, including frangible ware with a protective safety coating, and serving as a substrate suited to the application of decorative coatings.

The subject coating is aesthetically acceptable and commercially viable, being applied as a protective coat over a surface portion of a house ware, into which coat colour may be incorporated. The process consists of the steps of: applying to the subject ware a first organo-functional silicone coating as a coupling coating, to promote adhesion thereto of a subsequent coating; and applying the second (subsequent) coating, which is protective against physical, chemical and heat damage.

The second coating is particularly susceptible of receiving visual decoration, selected from the group consisting of colour and decoration, and combinations thereof and applied to the second coating. Such decorative application may form a part of the ongoing process, or may be applied subsequently, possibly elsewhere.

In some instances where decoration has been applied, a further outer protective plastic coating may be applied, the second and outer coating being selected from the group consisting of thermosetting plastics and thermoplastics and having a useful temperature of up to about 400 F. degrees.

The second coating, preferably a urethane coating, bonds securely to the coupling coating, even in the case of glass.

The urethane coating can be clear, tinted with dyes, or of a solid colour by the addition of organic pigments to the urethane, prior to the possible addition of further decorative and/or protective and isolating urethane coating applications. At least partial curing of each urethane coating upon its application is advised.

The present invention thus provides a protectively coated composite frangible ware able to withstand extensive commercial dishwashing while maintaining visual decoration preserved in an isolated and substantially hermetically sealed condition.

This protection may also extend to precious metal decoration applied to glass, china, ceramics, etc which can be readily protected by covering the entire surface, such as a plate, with a clear coupling coating of the organo-functional silicone, and a clear outer coating of a thermoplastic or thermosetting plastic having a useful temperature range well above that experienced in a commercial dishwasher. It is contemplated that this style of protection can also be applied to precious metal cutlery, such as knife and fork handles.

The outer, heat-protective plastic preferably has a useful operating temperature of at least about 400 F. (203 C.) degrees, at which temperature the impact resistance of the plastic remains effective. The method includes using plastics coating materials in liquid form, to provide a composite having a smooth coating of predetermined thickness.

The process enhances the break-resistance of the coated ware, the degree of impact protection being closely associated with the thickness of the second and any subsequent outer coating. The steps of applying coatings to the wares may be by way of flow or spray coating, followed by a drying or a curing step, which serves also to remove the respective liquid solvent or dispersant. The dispersant used may comprise a suitable liquid, water being the preferred liquid. The method may further include the step of curing the coated vessel composite under predetermined conditions of time and temperature.

It will be understood that visual decoration may include the application of printed text, and that the colour spectrum includes black. Also, the term visual decoration encompasses materials that are normally invisible, but become visible when viewed under black light (i.e. infra-red light). Color may be added by a printing process, possibly multi-coatings, or by combination with the second plastic coating. The polyurethanes have proved particularly useful as the second coating. The method may include the step of imprinting upon the second coating, including printing over a layer of colour.

It has been found that the second coating, of polyurethane is particularly amenable to the application of visual decoration.

In the case of an article having a second coating applied to the coupling coating, with decoration applied to the second coating by way of sublimation, such that the pigment is thermally bonded at sublimation temperature into the plastic coating, then a further protective coating may not be required.

Where the decoration is applied by screen or transfer printing, then a further plastic coat is generally required in protective, sealing relation thereover.

Thus, owing to the hermetically sealed isolation of the second coating and any decoration that it may carry, by virtue of the outer protective coat, the decorative material such as pigments may include toxic materials that normally are embargoed for use in the application of outer coatings. This then serves to extend the available range of coloured material that can be utilized.

The above described protective method to seal off potentially toxic surfaces is readily applied to the interior surfaces of drinking vessels that is subjected to wetting, such as mugs, wherein a silicone primer coating may be applied over such interior surfaces, and a urethane or like sealing plastic coating applied thereover in hermetic sealing relation therewith.

The bonding of the sealing coating is significantly enhanced by use of the silicone primer coating. This toxicity-containment may be of particular value in applying it to articles of suspect provenance, such as imported mugs, which may contain a toxic lead-based glaze.

The use of the present coating process with unglazed wares such as mugs and other wares is contemplated, wherein a clear-glaze effect can be provided by the application of the silicone primer coating, followed by an appropriate outer protective coating coupled thereto. Any desired colouring for the ware can be applied with the outer coating, or applied on an intermediate protective coating layer, and then covered by a further protective layer.

The subject method does not exclude applying ethylene copolymer in the role of an intermediate impact absorbing layer, after application of the silane (silicone) coupling coating. The impact absorbing layer can be applied as a plurality of coatings, to provide a desired aggregate thickness, as much as 5-mils or greater. A flow coating process is particularly useful in such a build-up. The outer, protective and heat-resistant layer of urethane, selected from thermosetting and thermoplastic urethanes, can be built up to a pre-determined thickness to achieve the desired extent of impact resistance. Flow coating and spray application may be utilized.

A particular advantage of flow coating, as opposed to spraying, is that the flow coating process can be readily interrupted and as readily re-started, without having to empty and flush out lines, as in spraying applications.

Urethanes have proved to be tougher than polyesters, with superior adhesion qualities, and improved resistance to abuse and chipping.

The build-up in thickness may be carried out layer by layer, preferably by way of flow coating. Spray coating may also be employed in applying the various coatings.

The preferred urethane is a thermosetting urethane. Use of water as the diluent could greatly facilitate recovery and recycling of excess material during the process.

Thirty commercial dishwasher cycles were judged as setting an acceptable commercial test standard, and was the testing standard adopted in the present invention.

The present invention provides a method of coating wares, particularly frangible wares selected from personal-use glassware, plateware of earthenware and china, and ceramic wares, with a protective coat, consisting of the steps of: applying to the vessel a first coating of an organo-functional silicone to serve as a coupling coating, to promote coupling adhesion thereto of a second, protective coating susceptible to decoration; and applying a decorative coating upon the second coating.

The second coating, and a third coating where necessary, is selected from the group consisting of thermosetting plastics and thermoplastics, being resistant to pressure at temperatures up to about 400 F. degrees. The third coating encapsulates and substantially hermetically seals the decorative coating, and provides a protectively coated decorative composite ware. The second coating is usually at least partially cured, and any further, outer urethane coat also is cured.

The organo functional silicone is characterized by its operation as an adhesion promoting agent. In particular, when applied to glass, the silicone reacts with moisture on the glass surface, and also with elements of the glass, to achieve a bonding relation. The urethane adheres with a strong attachment to the silicone bonding coating.

In applying decoration to glass and ceramics in accordance with the present invention over a urethane coating, in addition to screen and transfer printing, catalysed epoxy inks may be used. This enables screen printing using a nylon mesh with organic inks, and a stainless steel mesh with ceramic inks.

In the case of decoration by screen printing or by transfer printing over a urethane coated piece with UV inks and UV curing, a clear urethane outer coating may then be applied over the entire piece, which complements the impact protection afforded by the first urethane coating. For printing with epoxy inks upon a urethane coated piece, a subsequent curing at 100 F. degrees is proposed; however, as stated above, in some instances a further protective urethane coat may be dispensed with.

For pieces having decoration by sublimation onto a urethane coated surface a further protective urethane coat may be dispensed with, owing to the high durability of the decoration. Solid colour pigments may be combined with or applied to a urethane coating, to provide solid colour.

While the present invention is directed primarily to the provision of composite decorative wares that may incorporate hitherto unacceptable colour material, and having a heat and water resistant outer coating, the achievement of long term durability is also a primary aim.

In most instance, this includes meeting the safety and durability requirements of the food service industry.

In carrying out the present invention, in regard to the initial silicone "coupling" layer it was found that Silane A-1106 and Silane A-1130 (trademarks), developed by the DOW-CORNING chemical company, and now supplied by ISO Specialties Inc.; a WITCO company, of Greenwich, Conn. greatly enhanced the adhesion of a coating to the parent frangible substrate material, including glass.

The Silane was applied as a liquid, with water as the solvent, being preferably applied by flow coating.

It was found that when dried, the Silane coating coupled strongly with urethane.

The urethane was particularly receptive to printing, transfers and other manner of applying decoration.

The Silane coating was found to adhere strongly, even to glass, which normally is most difficult to coat and decorate.

In applying the Silane coating it was found that best results were obtained by applying a Silane coating to the parent glass material, and drying off the solvent water.

Upon then applying a decorative material it was found that the wetting and adhesion of the decorative material to the parent material was significantly enhanced. In the case of applying a full colour coating to the second, urethane coating, repeated "printings" may be applied, to achieve the desired intensity of colour.

In instances where an intermediate transparent impact absorbing layer may be utilized, ethylene copolymer was selected to serve as a shock-absorbing layer for the decorated glass composite. Unlike prior usage of ethylene copolymer, in which the resin has been applied by way of powder coating, by extrusion into sheet form or as a paste, in the present invention the ethylene copolymer is water based, the solid resin being dispersed in water; and may be applied by way of flow or spray coating, each application being cured before applying a succeeding coating. Thus, a cross-linked ethylene acrylic acid coplymer coating may be applied, to serve in-part as a printing face, on which organic inks containing dyes or organic pigments or inorganic pigments may be imprinted.

These colours do not include lead or cadmium where FDA regulations come into play.

The several and various printing processes referred to above are particularly amenable to the urethane coating. In many instances, a protective overcoat of urethane is then applied, after curing of the decorated coating to protect the decorative material against wear, and to complement the impact protection provided by the first urethane coating.

It has been found that a catalysed cross-linked urethane protective outer coating is readily applied, and has yielded excellent dishwasher protection to the wares, enabling them to meet the presently adopted standard of thirty commercial dishwashings without visually evident deterioration.

Also, the encapsulation of the decorative material was unimpaired, under normal usage. The urethane coating/coatings greatly improve the impact resistance of the wares, the cumulative thickness of urethane coating being a determining factor on the extent of such improvement. The uncoloured urethane coating possesses a clear and sparkling appearance that is long-lasting. A thermosetting polyurethane was preferred over a thermoplastic urethane, being applied as a solution. The thermosetting urethane solution consisted of a blend of solvents, comprising ethyl acetate, butyl acetate and isobutyl acetate. The less odiferous nature of isobutyl acetate makes it more acceptable in certain environments, where odor emissions are a problem. The use of a water-based thermosetting urethane is contemplated, for environmental and economic considerations.

It has been found that excellent coating results and improved material utilization are obtained using the flow coating process, as described in: Industrial Painting: Principles & Practice by Norman R. Roobal 1991 page 91, and incorporated herein by reference.

The plastic coatings are flow coated at about 20 C. degrees, applying the fluent plastics by nozzle under non-impact flow conditions, to flow a smooth layer over the object being coated. The use of flow coating enables close control of flow conditions, including control over the percentage of solids being deposited; the thickness of the wet state layer deposited; and the uniformity of layer thickness.

Also, during an operating work shift virtually all excess material from the process can be recovered as drainage, and recycled through the process, to achieve an extremely high degree of material utilization. Actual loss of material during coating and the clean-up at the end of a shift is expected to total no more than 15%, giving an overall high transfer efficiency of some 85%. This compares with a transfer efficiency of about 40 to 60% in the case of many (non-water) spray applications.

In the instance of drinking glasses and similar open-topped personal use vessel composites, the glasses, mugs etc may be inverted on a conveyor system, being rotated to facilitate external application of a respective plastic from the flow coating nozzles, with excess plastic falling into drip pans, for recycling directly back into the process. Coating in this inverted position has the advantage that, with sag, the coating tends to be thicker at the lower, more vulnerable lip zone portion of the glass.

In the case of applying an external coating to an upright vessels, a mandrel may be inserted in the mouth of the vessel, to limit the penetration of the plastic coating to a desired extent into the mouth of the vessel.

The usual extent of taper of the glass wall facilitates withdrawal of the mandrel. In the case of drinking glasses, penetration of the coating by about five mil past the lip affords a desired extent of lip protection. Modified mandrels that extend deeper into the glass may be used to facilitate deeper flow penetration.

For inverted glasses and other drinking wares, such as mugs, under flow coating, the coating tends to spread across the lip surface, affording a degree of protection to the lip of the vessel. The present process enables the economic introduction to glass and ceramic wares, of decorative enhancement such as colour, the provision of irridescence or pearlescence, and the application of additives to provide the characteristic of thermally-reponsive colour change.

A further characteristic that may be readily incorporated with the subject coating process is the introduction by blending with the urethane, additives that glow when illuminated under "black light" i.e. infra-red light.

Certain of the benefits obtained from the present invention in relation to imprinting upon frangible wares may also apply to stainless steel, upon which an initial coating of Silane then permits the coating with urethane, and the application of colour and printing, in the manner of the above described frangibles. The application of a comparatively thin layer of urethane then provides the desired hermetic sealing and encapsulation of the decorative materials.

In the case of frangible wares, the virtual increase in strength of a coated composite and its reduced vulnerability to impact damage may permit the adoption of less bulky sections i.e. thinner walls and lighter structure, in which case significant cost savings may be achieved due to reduction in breakage during handling, shipping and ultimate use, with reduced shipping charges due to weight reduction, as well as savings in the costs of material for the products per se. The exterior coating of hollow ware (e.g. glasses and mugs) while in an inverted position, such as by a flow coating process, removes any need to mask-off the interior of the hollow vessel being coated, due to the inverted position.

While spray application of the protective plastic coats is feasible, as in spray painting, the associated equipment costs are significantly greater, and material utilization may be reduced. A prolonged period of experimentation and testing led to the following findings: A water-based silane, flow coated on drinking glasses at the rate of approximately one quarter to one sixth of a gram per glass, produced an even, visually imperceptible wet-state coating of two to three microns thickness, the silane serving as an adhesion promoting coupling agent for the subsequent urethane coating. The dried silane coating was found to significantly enhance the wetting and flow characteristics of the succeeding coating. Subsequent testing also showed a significant enhancement in the adherence of the urethane coating to the glass.

A desired form of decorative material was applied to the urethane coating.

In the case of non-sublimation decorative applications a further protective urethane coating was then applied.

In the case of wares intended to withstand commercial or domestic dishwasher action, such as drinking glasses a high temperature resin coating, preferably a thermosetting resin, can be applied to serve as a protective coating, able to withstand repeated washing cycles in a commercial dishwasher, while maintaining the decorative material isolated, being substantially hermetically sealed, while also protecting the ware and its decorative finish against impact and abrasive damage.

In instances where an additional intermediate protective coating is used, in protective relation, one example, an ethylene copolymer may consist of a blend of: about 80 to 99 percent by weight, based on the total weight of the blend, of a random, normally solid ethylene copolymer selected from the group consisting of normally solid ethylene/acrylic acid copolymers, ethylene/methacrylic methacrylic acid copolymers and copolymers having 10 to 90 percent weight of the carboxylic acid groups of the ethylen/acrylic or ethylene/methacrylic acid copolymers ionized by neutralization with metal ions having an ionized valence of one to three inclusive, wherein the random ethylene copolymers contain about 8 to about 25 percent by weight of acrylic or methacrylic acid copolymerized therein, made as a solid resin.

The solid copolymer was converted to a dispersion in water, the water serving as the carrier liquid, with application of the ethylene copolymer dispersion, in a series of sequential flow coatings, with intermediate curing phases to effect cross-linking of the ethylene copolymer while also removing the liquid dispersant from the plastic, enabling the build-up of a smooth coating to a desired thickness, in accordance with the intended duty and degree of impact resistance required, complementary to that protection provided by the protective outer plastic coating. For some uses a 2-mil (0.002 inches) ethylene copolymer coating may be provided, to enhance the resistance to impact and also the strength of the composite ware.

Greater or lesser thicknesses may be readily achieved.

The preferred protective coating, selected from the group consisting of thermo-setting plastics, comprised polyurethane, with minimum useful temperatures as high as 204C. degrees Other thermoplastics having lower minimum useful temperatures, of at least about 82 C., which include some polyurethanes, may be suitable for withstanding commercial and household dishwashing.

The ware with its applied coating thereby provides a reinforced composite having enhanced impact resistance, as well as high abrasion resistance and chemical resistance, and the capability to withstand commercial or household dishwashing.

In the case of a thermosetting plastic outer coating, the final, thermosetting coating is cured under predetermined conditions of time and temperture.

Alternative protective outer coatings may be selected from a catalysed acrylic or polyester. Some thermoplastics, having a softening point at least close to the boiling point of water may also prove suitable for the outer coating, where dish washer resistance is a primary aim.

The use of polycarbonate as the protective outer coating also is contemplated.

The coatings are preferably liquid, in order to utilize the flow-coating process. For the reasons given above, water is the preferred liquid base, or dispersant.

The action of the respective coatings in relation to an article is understood to be as follows: the initial Silane coating reacts chemically with moisture on the surface of the article and possibly with elements of the article, to bond thereto.

The Silane coating, serves as a coupling agent for the coatings applied thereto. This is of particular importance in the case of glass, where the Silane reacts chemically with the moisture on the surface of the glass, and with components in the glass. The cured Silane then serves as a coupling agent and bonds with the applied plastic coating, preferably a urethane coating, which provides the suitable, compatible base for the application of colour and decoration by any of the three above-described processes.

The great adhesive characteristic of the urethane makes chemical linkage unnecessary. However, for other applications with different performance requirements, or for other reasons, a chemical linkage, provided by way of a reactive group to link with the underlying coating may chemical linkage, provided by way of a reactive group to link with the underlying coating may prove desirable.

A further advantage of the subject process is that the wares may be at ambient (room or workshop) temperature, for the application of each of the coatings, i.e. at about 20 C. degrees, unless the form of decoration application decrees otherwise.

Provision is usually made for flash-drying off of the liquid carrier in ovens operating in the range 30 to 60 C. degrees, before setting-up and curing of the respective coatings, at 90–95 C.

It will be understood that for drinking glasses or commestible dishes, due to the hermetic sealing off of the decorative substances by the urethane outer coating, the wares should no longer need to meet the requirements of the "Food and Drug" Act, subject to approval being obtained from the appropriate authority, along with the establishment of environmental compatibility.

The flow coating and associated drying procedures are sufficiently uncomplicated that coating of the wares may take place on the manufacturer's line, at comparatively low temperatures. Where spraying equipment already exists, the process is well suited to utilize spray applications. In the case of catalysed outer coatings, these may cure at room temperature in some instances. In addition to the tested use of the subject laminated coating for drinking glasses, its use may extend to include the decorating of glassware such as mixing bowls, punch bowls, and the like, as well as the other above-mentioned groups of products where improved appearance, enhanced safety and favorable process economics are important factors.

It will be understood that the present process enables composites to be "tailor-made" for their intended usage, in that the respective coating thickness of the outer protective coating can be selectively applied for optimum results.

Where an intermediate coating such as the above disclosed copolymer is incorporated, it can be selectively applied for optimum results.

Should breakage occur, a heavier urethane outer coating of the wares provides a stronger skin to better resist impact stresses. Also, the heavier urethane coating provides more abrasion and chemical resistance.

A further advantage of the present invention is in the use of color, or other appearance enhancements, referred to above.

In contrast to existing glass decoration programs that require the use of a coloured frit with a full furnace of glass, the subject plastic coating process may include the addition of color to the glassware, by way of the coating the urethane surface, thereby enabling colouration in small batches, or even the individual coloration of articles.

Consequently, the range of colors can be extended without undue economic penalty. In the case of articles for use with commestibles, these are presently subject to FDA (Food and Drug Administration) regulations, where a range of printing inks has been approved. The present invention enables the expansion and updating of these regulations, subject to adequate inspection controls.

A further advantage of the subject process is that the plastic-coated outer surface of the composite may also be readily printed upon, using catalysed inks with conventional printing processes, which may include the use of ultra-violet or heat curing, to enhance dish washer and wear resistance.

In the case of coated frangible composites intended for use with food or drink, the use of ultaviolet light to cure the urethane outer coating is not approved by the FDA, as undesirable components can be extracted during FDA's testing procedures.

A significant advantage of the present process is that the flow-coatings, whether single or laminated can be readily applied to a wide range of object configurations, enabling the products to compete with plastic products.

It is contemplated that composite vessels in accordance with this invention may be of lighter construction, having a thinner parent wall, which when protectively coated are capable of sustaining usage and handling stresses. This reduced mass in turn can afford very real savings in terms of washing machine hot water and drying energy requirements.

It is further contemplated that the subject process may be applicable with unglazed ceramics. In order to evaluate the improvement in impact resistance of one class of frangible articles that had been coated with a Silane bonding coat and an adherent urethane coat, impact tests were carried out on drinking glasses, both coated and uncoated, using a swinging ball on a test stand, as more fully disclosed in the above identified parent application, and embodied herein by reference.

The test stand incorporates a heavy base carrying a rigid mast. A cross bar adjustably secured to the mast has a pendulum cord secured thereto to which a steel ball of a given weight is secured. The cross bar is adjusted in accordance with the length of the cord selected for that type of glass, and in accordance with the height of the glasses being tested, such that impact of the ball will take place against the vulnerable upper portion of the glass, when supported upon the base.

For each test the ball is released from a predetermined measured height, with the cord just taut, for the ball to swing arcuately down and directly impact the glass being tested.

The plane of swing is at right angles to the cross bar, such that the mast is not in the plane of swing, and consequently it does not contact or constrain the vessel under test.

In order to calibrate the test apparatus for a given batch of glasses, the length of the cord and the drop height are selected, with corresponding adjustment to the height of the cross-bar on the mast, in order to achieve a measurable high rate of breakage such as 80% of the virgin (untreated) glasses.

The treated glasses are then also tested under precisely the same conditions, enabling a Statistical measurement of the improvement in durability to be obtained. It was found that marked improvement in the survival rate was obtained, using the Silane coupling coat and a urethane coat coupled thereto, the extent of improvement being tied somewhat directly to the thickness of the urethane coat.

BRIEF DESCRIPTION OF THE DRAWINGS

Certain embodiments of the invention are described by way of illustration, without limitation of the invention thereto, other than as set forth in the claims hereof, reference being made to the accompanying drawings, wherein:

DETAILED DESCRIPTION OF THE INVENTION

Figure 1:
FIG. 1 is a side perspective view of a mug coated in accordance with the present invention.

Turning to the drawings, a white-glazed drinking mug 10 has a body portion 12, with handle portion 14.

The mug outer surface 16 has an undercoat 17 of Silane organic functional silicone coated thereover; and a coloured second coating 19 of a protective, scuff-resistant surface coating of high temperature plastic, preferably thermoset polyurethane, applied thereover, and at least partially cured.

Decorative matter 20, in this case wording, is applied to the coloured second coating 19.

An outer protective coating 22 of high temperature plastic overlies the whole outer surface of the mug body portion 12 and the handle 14, and is cured.

The interior portion 24 of the mug 10 has an undercoat 17 of Silane and a second coating 26 of clear high temperature plastic thereover, which is cured.

Figure 2:
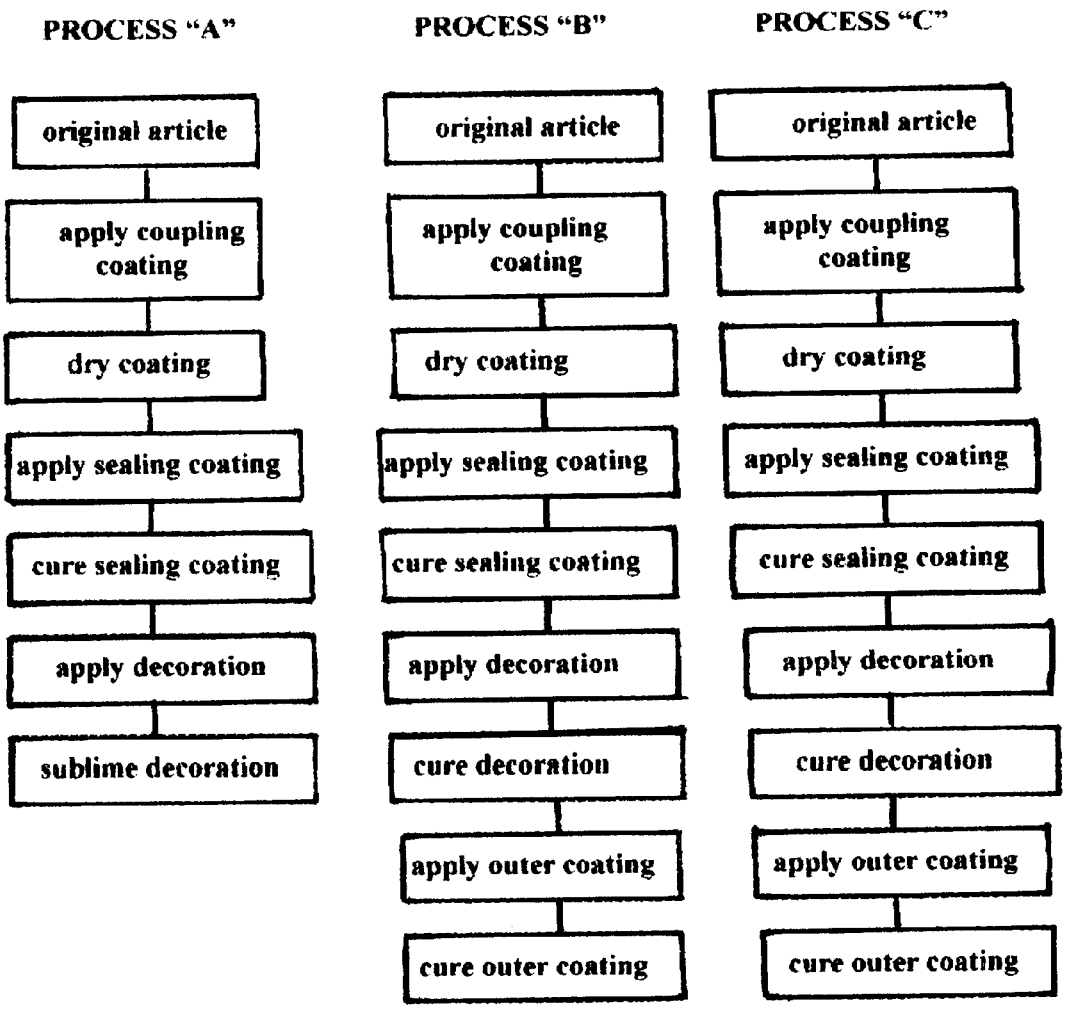
FIG. 2 consists of coating process sequence diagrams for Processes A, B and C; and, FIG. 3 consists of coating process sequence diagrams for Processes D and E.

Turning to FIG. 2, the process A commences with the original article; applying a coupling coating of organo functional silicon thereto; drying the coating; applying a second, sealing coating of plastic thereover; curing the sealing coating into coupled relation with the underlying coupling coating; applying the decoration (such as text) of sublimation material; and sublimating the decoration by vaporization into the cured second coat. The sealing coating may be clear or coloured, as described above.

Process B of FIG. 2 relates to the subject coating process, wherein the decorative step involves screen printing the decorative surface. The process B steps follow those of process A, except that the decoration is cured, followed by the application of a third, clear coating, overlaying the decoration in hermetic sealing relation. The outer coating is then cured. This coating serves to complement the protective and shock-absorbing qualities of the second, sealing coating. The second, sealing coating may itself be coloured, as described above.

Process C of FIG. 2 is substantially identical to that of process B, the difference being that the decoration is applied by transfer printing. The subsequent steps are the same as for process B, with the application and curing of an outer protective coating, and possible use of a coloured second coat.

Figure 3:
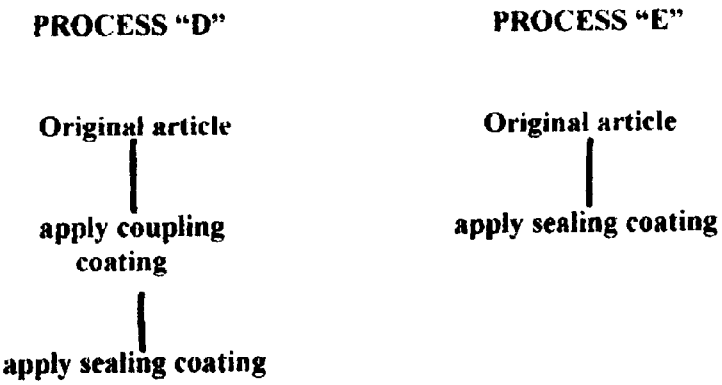

Turning to FIG. 3, process D shows the application step of a coupling coating to the article, followed by the application of the sealing coating. Intermediate steps of drying the coupling coating, and curing the sealing coating have been omitted from the disclosure, for convenience. In process E the step of applying a coupling coating is omitted, due to the nature of the article being coated. Thus, in the case of a knife handle, a urethane coating may be applied, for 'subsequent application of decoration that is then sublimated into the applied urethane coating. Owing to the tenacious bond of the urethane to certain bases, such as metals, the coupling action of the organo-functional silicone may not be required. Also, the form of the article may contribute to the tightness of the urethane bond. Also, the sublimation process, with vaporization of the decoration into the coating, may mean that no additional protective coating is necessary. However, a third, supplemental protective clear coating may be applied if desired, for enhanced protection.

What is claimed is:

1. A composite household ware for use with consumables, said ware having compound surfaces including curved surfaces with a radius of curvature of less than 12 inches, a protective, scuff-resistant highly adherent surface coating of high temperature plastic applied to a surface portion of the ware, wherein the surface coating encompasses and substantially hermerically seals said surface portion, said coating being substantially visually undetectible and susceptible of decoration, and providing impact and scuff resistance to the ware.

2. The ware as set forth in claim 1, wherein said surface is an exterior surface of said ware.

3. The ware as set forth in claim 1, wherein said surface is an interior surface of said ware.

4. The ware as set forth in claim 1, including an imperceptible and unblemished organo-functional silicone undercoat component adhering to said surface in bonded relation with a surface portion of the ware and providing coupling connection of said high temperature plastic with said ware.

5. The ware as set forth in claim 4, said high temperature plastic being selected from the group consisting of thermoplastics and thermosetting plastics.

6. The ware as set forth in claim 4, said high temperature plastic being selected from the group consisting of thermosetting plastics.

7. The wares as set forth in claim 1, including decoration applied to said high temperature plastic.

8. The wares as set forth in claim 7, wherein said decoration is a sublimated decoration.

9. The wares as set forth in claim 7, wherein said decoration is a screen printed decoration.

10. The wares as set forth in claim 7, wherein said decoration is a transfer decoration.

11. The wares as set forth in claim 8, having a highly adherant outer coating of high temperature plastic.

12. The wares as set forth in claim 9, having a highly adherent, outer coating of high temperature plastic.

13. The wares as set forth in claim 10, having highly adherent, outer coating of high temperature plastic.

14. The composite ware as set forth in claim 1, being selected from the group consisting of glassware, ceramic ware, earthenware and china.

15. The composite ware as set forth in claim 1, said wares comprising flatware.

16. The method of applying a safety coating to a household article to be used with consumables, including the steps of applying to the vessel a first organofunctional silicone coating, to promote adhesion thereto of a subsequent plastic coating; and applying a second overlaying highly adherent, substantially visually imperceptible plastic coating selected from the group consisting of thermosetting plastics, and thermoplastics having a minimum useful temperature of at least about 203 C. degrees.

17. The method as set forth in claim 16, including the step of incorporating color with said second coating.

18. The method as set forth in claim 17, including the step of imprinting said second coating.

19. The method as set forth in claim 17, including applying a protective substantially visually imperceptible overcoating to hermetically seal said imprinting.

20. The method as set forth in claim 19, wherein said overcoating is a urethane, the respective thickness of said second coating and of said overcoating being selectively variable, to provide a vessel composite of selected impact resisting characteristics.

* * * * *